United States Patent
Park

(10) Patent No.: US 8,380,327 B2
(45) Date of Patent: Feb. 19, 2013

(54) FLEXIBLE ELECTRONIC PRODUCT HAVING A SHAPE CHANGE CHARACTERISTIC AND METHOD THEREOF

(75) Inventor: Hyung Ik Park, Seoul (KR)

(73) Assignee: Pantech Co., Ltd., Seoul (KR)

( * ) Notice: Subject to any disclaimer, the term of this patent is extended or adjusted under 35 U.S.C. 154(b) by 246 days.

(21) Appl. No.: 12/849,614

(22) Filed: Aug. 3, 2010

(65) Prior Publication Data

US 2011/0188189 A1   Aug. 4, 2011

(30) Foreign Application Priority Data

Jan. 29, 2010 (KR) .................. 10-2010-0008584

(51) Int. Cl.
| H05K 5/00 | (2006.01) |
| H05K 7/00 | (2006.01) |
| H01S 4/00 | (2006.01) |
| H04M 1/00 | (2006.01) |
| G05B 15/00 | (2006.01) |
| G05B 11/01 | (2006.01) |
| G06F 17/00 | (2006.01) |
| G06F 3/00 | (2006.01) |
| G06F 15/00 | (2006.01) |

(52) U.S. Cl. .................. 700/1; 700/11; 700/18; 700/90; 710/1; 710/5; 710/30; 712/1; 361/679.01; 361/679.21; 361/679.22; 361/679.26; 361/679.3; 455/575.1; 455/575.3; 455/575.4; 455/575.9; 29/592.1

(58) Field of Classification Search ............. 361/679.01, 361/679.21, 679.22, 679.26, 679.3; 455/575.1, 455/575.3, 575.4, 575.9; 29/592.1; 700/1, 700/11, 18, 90; 710/1, 5, 30; 712/1
See application file for complete search history.

(56) References Cited

U.S. PATENT DOCUMENTS

| 5,724,121 | A | 3/1998 | McKinley et al. |
| 5,925,298 | A | 7/1999 | Walles et al. |
| 6,771,232 | B2 * | 8/2004 | Fujieda et al. .................. 345/30 |
| 7,180,665 | B2 * | 2/2007 | Daniel et al. .................. 359/461 |
| 7,310,050 | B2 * | 12/2007 | Yeh .......................... 340/815.83 |
| 7,558,057 | B1 * | 7/2009 | Naksen et al. ........... 361/679.56 |
| 7,639,237 | B2 * | 12/2009 | Perkins ........................ 345/168 |
| 8,009,422 | B2 * | 8/2011 | Misawa .................. 361/679.55 |
| 2001/0003450 | A1 * | 6/2001 | Hemia et al. .................. 345/170 |
| 2002/0090980 | A1 * | 7/2002 | Wilcox et al. ................. 455/566 |
| 2003/0048256 | A1 * | 3/2003 | Salmon ......................... 345/168 |
| 2003/0071800 | A1 * | 4/2003 | Vincent et al. ............... 345/204 |
| 2004/0061683 | A1 * | 4/2004 | Mochizuki et al. .......... 345/168 |
| 2006/0038745 | A1 * | 2/2006 | Naksen et al. ................. 345/30 |

(Continued)

FOREIGN PATENT DOCUMENTS

| DE | 101 51 242 | 5/2003 |
| JP | 07-140451 | 6/1995 |

(Continued)

OTHER PUBLICATIONS

European Search Report of Apr. 12, 2011 in the corresponding European Patent Application No. 10 18 0113.

*Primary Examiner* — Anthony Haughton

(74) *Attorney, Agent, or Firm* — H.C. Park & Associates, PLC

(57) ABSTRACT

A flexible electronic product includes a flexible electronic assembled body and an actuator including a shape memory member. The actuator of the flexible electronic product deforms in response to an input. The flexible electronic assembled body includes a flexible display device, such as an organic light emitting diode (OLED), a plastic liquid crystal display (LCD), a plastic plasma display panel (PDP), an electronic ink panel, an organic thin film transistor (OTFT).

2 Claims, 9 Drawing Sheets

U.S. PATENT DOCUMENTS

2006/0109250 A1  5/2006  Prichard et al.
2006/0209218 A1* 9/2006  Lee et al. .................... 349/1

FOREIGN PATENT DOCUMENTS

| JP | 11-109880 | 4/1999 |
| JP | 2006-042400 | 2/2006 |
| JP | 2006-163099 | 6/2006 |
| JP | 2006-243621 | 9/2006 |
| KR | 10-2006-0078700 | 7/2006 |
| KR | 10-2007-0094335 | 9/2007 |
| KR | 10-2009-0087303 | 8/2009 |

* cited by examiner

FLEXIBLE ELECTRONIC PRODUCT HAVING A SHAPE CHANGE CHARACTERISTIC AND METHOD THEREOF

CROSS-REFERENCE TO RELATED APPLICATION

This application claims priority from and the benefit under 35 U.S.C. §119(a) of Korean Patent Application No. 10-2010-0008584, filed on Jan. 29, 2010, the disclosure of which is incorporated herein by reference for all purposes.

BACKGROUND

1. Field

This disclosure relates to a flexible electronic product having a shape change characteristic, a method for changing a shape, and a shape change device.

2. Discussion of the Background

Electronic products generally include a display assembled body and a frame. Examples of the display assembled bodies may include organic light emitting diodes (OLEDs), plastic liquid crystal displays (LCDs), plastic plasma display panels (PDPs), electronic ink panels, which are also referred to as electronic papers, organic thin film transistors (OTFTs), and the like.

Examples of electronic products configured with the above-mentioned display members may include mobile communication terminals, monitors, televisions, navigation systems, notebooks, electronic books, electronic papers, and electronic notebooks.

However, although the electronic products employ the next-generation display members or the next-generation display assembled bodies, the electronic products have typical and fixed structures due to the presence of the frames assembled and combined therewith. Accordingly, existing electronic components have fixed shapes and structures and may not be flexibly changed into various shapes and structures.

SUMMARY

Exemplary embodiments of the present invention provide an electronic product capable of organically reacting with input information and adopting a changed shape.

Additional features of the invention will be set forth in the description which follows, and in part will be apparent from the description, or may be learned by practice of the invention.

An exemplary embodiment provides a flexible electronic product, including: a flexible electronic assembled body; and an actuator disposed along at least a portion of the flexible electronic assembled body to change a shape of the flexible electronic assembled body.

An exemplary embodiment provides a flexible electronic product, including: a is fixed member and a slide member disposed to overlap; an actuator disposed at an interface between the fixed member and the slide member and connected to the fixed member and the slide member; a winding unit disposed in the fixed member; and an electronic assembled body having a first end connected to the winding unit and a second end connected to the slide member.

An exemplary embodiment provides a method for changing a shape of a flexible electronic product, wherein the flexible electronic product includes a flexible electronic assembled body and an actuator disposed along at least a portion of the flexible electronic assembled body to change a shape of the flexible electronic assembled body, the method for changing a shape including: an external input processing process comprising recognizing a signal input, generating a condition value of input information on the input signal; a database processing process comprising searching a database for a shape information value corresponding to the condition value; and a shape controlling process comprising supplying power to the actuator, the power corresponding to the shape information value searched in the database processing process, and controlling a change in shape of the actuator that receives the power.

An exemplary embodiment provides a shape change device of a flexible electronic product, wherein the flexible electronic product includes a flexible electronic assembled body and an actuator disposed along at least a portion of the flexible electronic assembled body to change a shape of the flexible electronic assembled body, the shape change device including: an external input processor to recognize an external input and to generate a condition value corresponding to the external input; a database processor to search a database for a shape information value corresponding to the generated condition value; and a shape controller to control a change in shape of the actuator corresponding to the searched shape information value.

It is to be understood that both the foregoing general description and the following detailed description are exemplary and explanatory and are intended to provide further explanation of the invention as claimed. Other features and aspects will be apparent from the following detailed description, the drawings, and the claims.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1A:
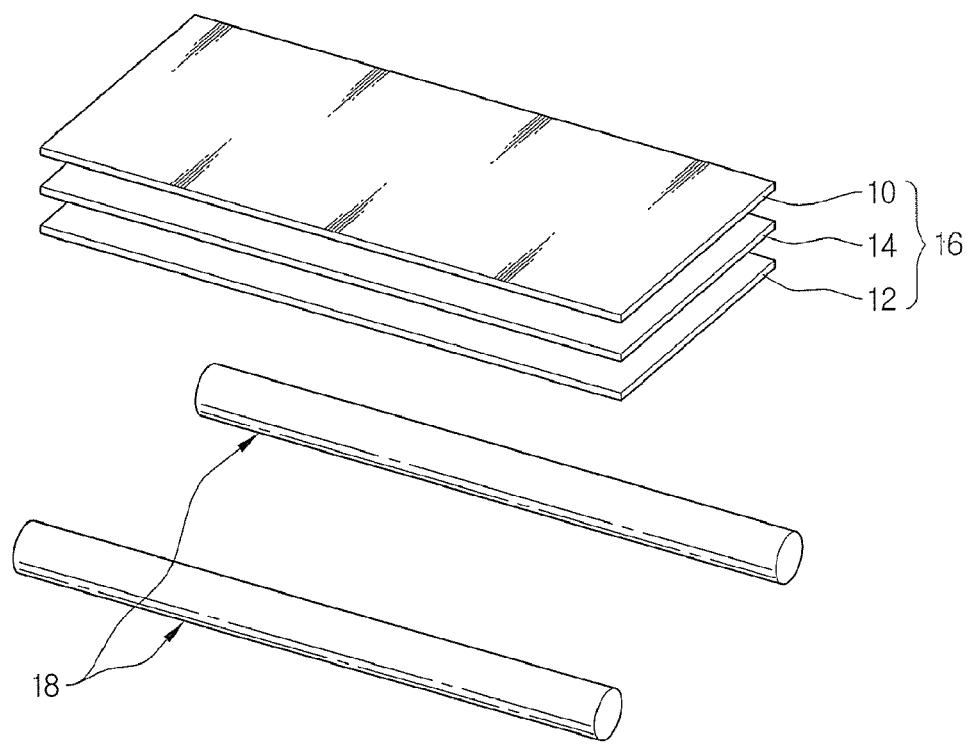
FIG. 1A is an exploded perspective view illustrating a flexible electronic assembled body and an actuator according to an exemplary embodiment.

Exemplary embodiments now will be described more fully hereinafter with reference to the accompanying drawings, in which exemplary embodiments are shown. This disclosure may, however, be embodied in many different forms and should not be construed as limited to the exemplary embodiments set forth therein. Rather, these exemplary embodiments are provided so that this disclosure will be thorough, and will fully convey the scope of this disclosure to those skilled in the art. In the description, details of well-known features and techniques may be omitted to avoid unnecessarily obscuring the presented embodiments.

The terminology used herein is for the purpose of describing particular embodiments only and is not intended to be limiting of this disclosure. As used herein, the singular forms "a", "an" and "the" are intended to include the plural forms as well, unless the context clearly indicates otherwise. Furthermore, the use of the terms "a", "an", etc. does not denote a limitation of quantity, but rather denotes the presence of at least one of the referenced item. It will be further understood that the terms "comprises" and/or "comprising", or "includes" and/or "including" when used in this specification, specify the presence of stated features, regions, integers, steps, operations, elements, and/or components, but do not preclude the is presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

In the drawings, like reference numerals denote like elements. The shape, size and regions, and the like, of the drawing may be exaggerated for clarity.

When two elements are described as being "coupled", "coupled to", "connected", or "connected to", the two elements may be directly coupled or connected or other elements may be disposed therebetween.

According to an exemplary embodiment, an actuator is disposed on at least a portion of an edge of a flexible display assembled body, and the actuator changes a shape of the flexible display assembled body.

Figure 1B:
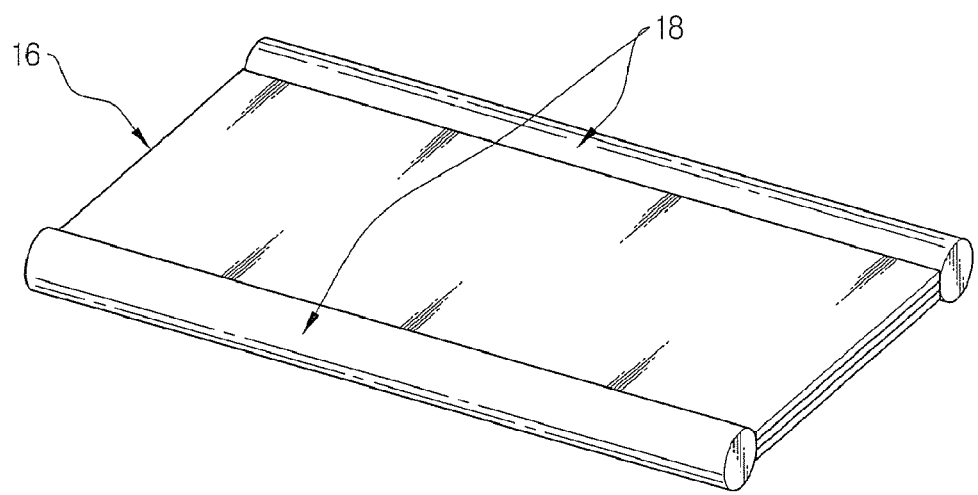
FIG. 1B is a combined perspective view of FIG. 1A.
Figure 1C:
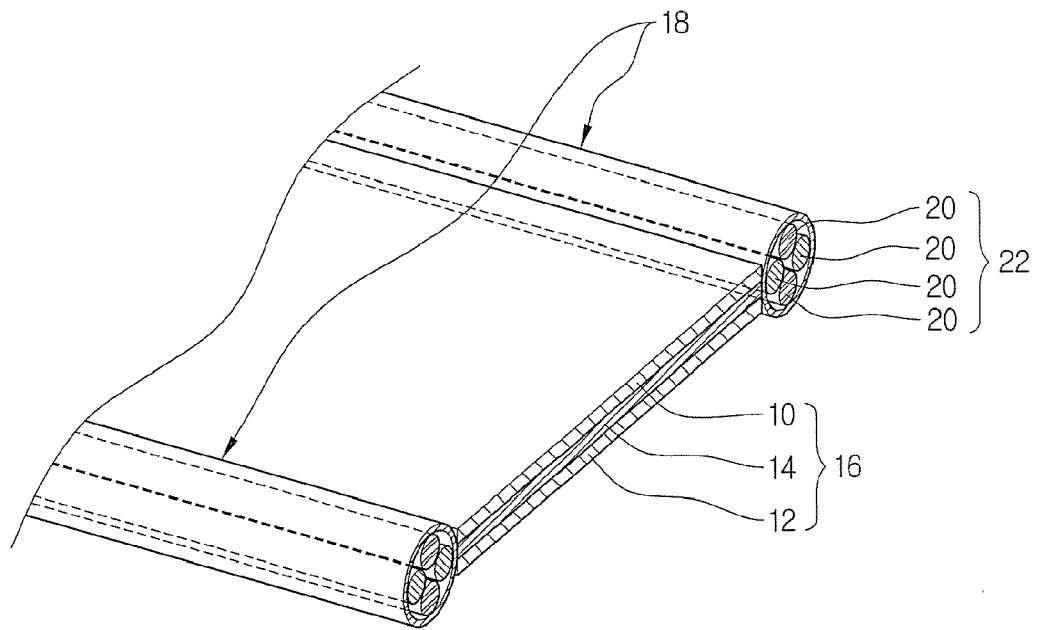
FIG. 1C is a cross-sectional perspective view of a portion of FIG. 1B.

FIG. 1A, FIG. 1B, and FIG. 1C illustrate a flexible electronic product having a shape change characteristic according to an exemplary embodiment. FIG. 1A is an exploded perspective view illustrating a flexible electronic assembled body and an actuator. FIG. 1B is a combined perspective view of FIG. 1A. FIG. 1C is a cross-sectional perspective view of a portion of FIG. 1B.

As illustrated in FIG. 1A, FIG. 1B, and FIG. 1C, a flexible electronic assembled body 16 includes a flexible display member 10, a flexible power supply member 12, and a is flexible substrate 14 disposed therebetween. The flexible substrate 14 connects the flexible display member 10 to the flexible power supply member 12.

The flexible display member 10 may include an OLED, a plastic LCD, a plastic PDP, an OTFT, an electronic ink panel, or the like. Further, any display panel having flexibility may be used.

As an example of the flexible power supply member 12, a flexible organic solar cell may be used. The flexible power supply member 12 may include any power supply unit having flexibility, or a power supply member or a power supply material capable of supplying electric energy to the flexible electronic assembled body 16.

As an example of the flexible substrate 14, a flexible printed circuit board (FPCB) may be used. Further, the flexible substrate 14 may include any circuit board or controller having flexibility.

The flexible electronic product may also include an actuator 18. As the actuator 18, an actuator for shape change is used. The actuator 18 may be a frame connected to a part of or the entire edge of the flexible electronic assembled body 16.

In FIG. 1A, FIG. 1B, and FIG. 1C, the actuators 18 are disposed on parallel sides of the flexible electronic assembled body 16. The actuator 18 may be made of a flexible material, and, for example, may include a shape memory member 20. Moreover, the actuator 18 may be configured with a single shape memory member 20 or a shape memory member assembled body 22 including a plurality of the shape memory members 20 as shown in FIG. 1C.

As described above, the shape memory member assembled body 22 includes a plurality of the shape memory members 20. The shape memory member assembled body 22 and the shape memory members 20 may be shaped to be linear, polygonal, or circular, and is combinations thereof. Examples of the shape memory member assembled body 22 having the above-mentioned configuration are illustrated in FIG. 2A, FIG. 2B, and FIG. 2C.

Figure 2A:
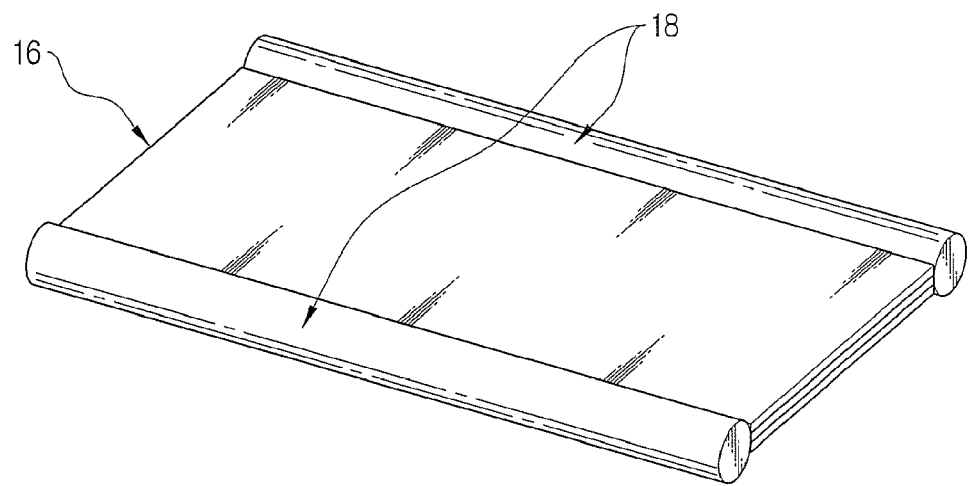
FIG. 2A, FIG. 2B, and FIG. 2C are perspective views illustrating changed shapes of actuators changed to be linear, polygonal, and circular or arced, respectively.
Figure 2B:
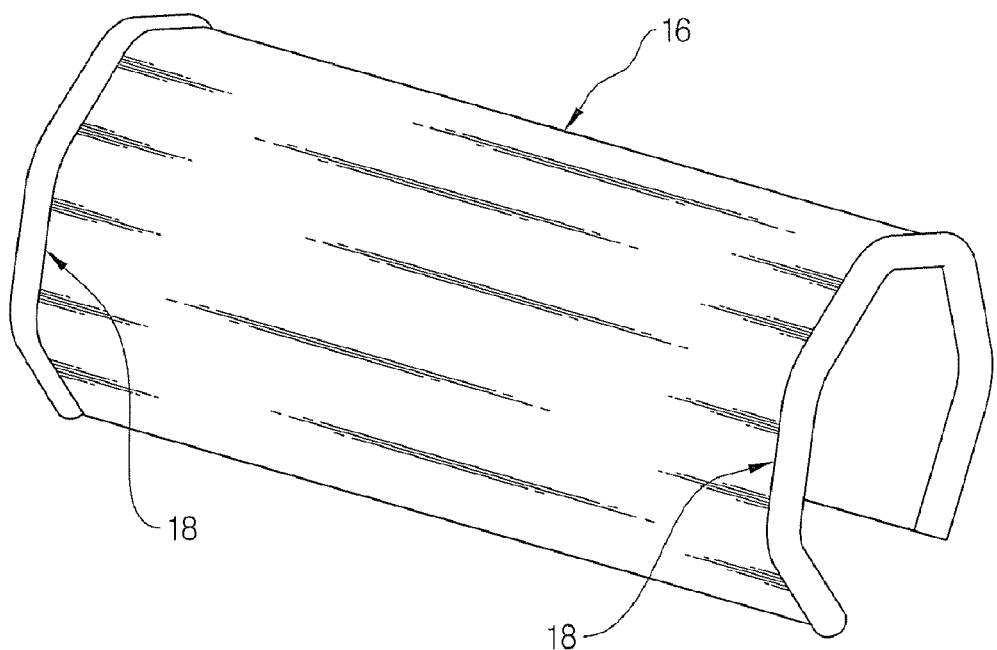
Figure 2C:
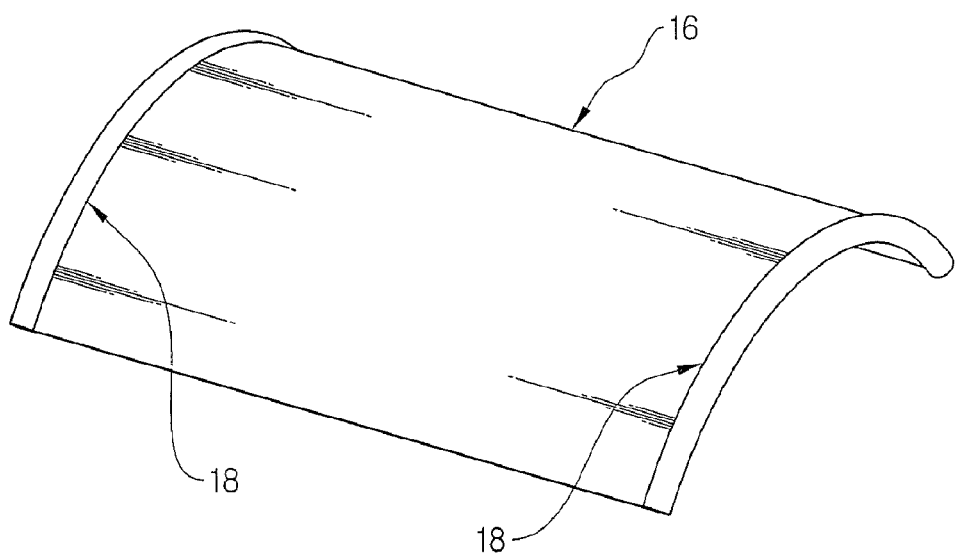

As illustrated in FIG. 2A, FIG. 2B, and FIG. 2C, if power is supplied to the actuator 18 of the shape memory member assembled body 22, the shape memory member 20 is changed into a shape that the shape memory member 20 remembers, i.e., the shape memory member 20 deforms and retains the deformed shape. Therefore, the flexible electronic assembled body 16 exhibits a new shape according to the change of the shape memory member 20.

FIG. 2A, FIG. 2B, and FIG. 2C are perspective views illustrating changed shapes of the actuators 18 configured with the shape memory member 20 changed to be linear, polygonal, and circular or arced, respectively. The shape memory member 20 and the shape memory member assembled body 22 including the shape memory member 20 may be changed to shapes other than the changed shapes illustrated in FIG. 2A, FIG. 2B, and FIG. 2C.

As described above, the flexible electronic assembled body 16 and the flexible actuator 18 deform to form the changed shapes.

Figure 3:
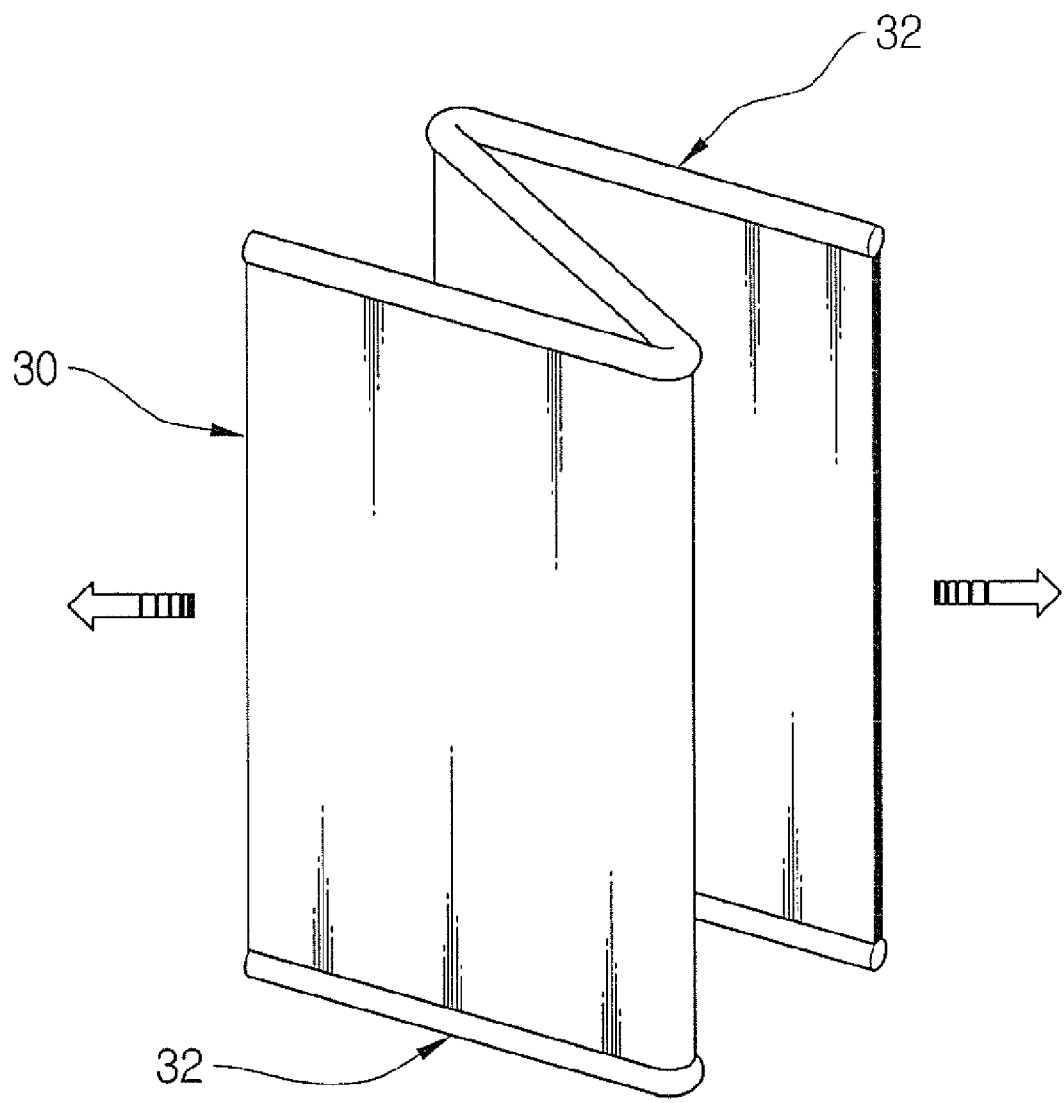
FIG. 3 is a perspective view of a flexible electronic product having a shape change characteristic according to an exemplary embodiment.

According to an exemplary embodiment, a flexible electronic device includes a flexible electronic assembled body having a structure for folding in partitioned areas and an actuator. FIG. 3 is a perspective view of a flexible electronic product having a shape change characteristic according to an exemplary embodiment.

As illustrated in FIG. 3, actuators 32 are disposed at opposite edges of a flexible electronic assembled body 30, which can be folded or unfolded with respect to partitioned areas.

The actuator 32 is changed to induce the flexible electronic assembled body 30 to be folded or unfolded into the partitioned areas so as to change a shape of the flexible electronic is assembled body 30.

The actuator 32 may include a member that exhibits flexibility, for example, the shape memory member 20 as described above. The actuator 32 may be configured with the single shape memory member 20 or the shape memory member assembled body 22 including a plurality of the shape memory members 20.

Shape memory members 20 or shape memory member assembled bodies 22, which are changed into different shapes to change the shape of the flexible electronic assembled body 30, may be applied to the areas of the flexible electronic assembled body 30. As such, the areas of the flexible electronic assembled body 30 may be bent, curved, and folded. Therefore, the shape of the electronic product may be changed into various shapes by a combination of the individual changes in shapes of the areas and folding. As shown in FIG. 3, the flexible electronic assembled body 30 may be bent into partitions. The partitions may be static or may be changed to different locations along the length of the actuators 32.

Figure 4:
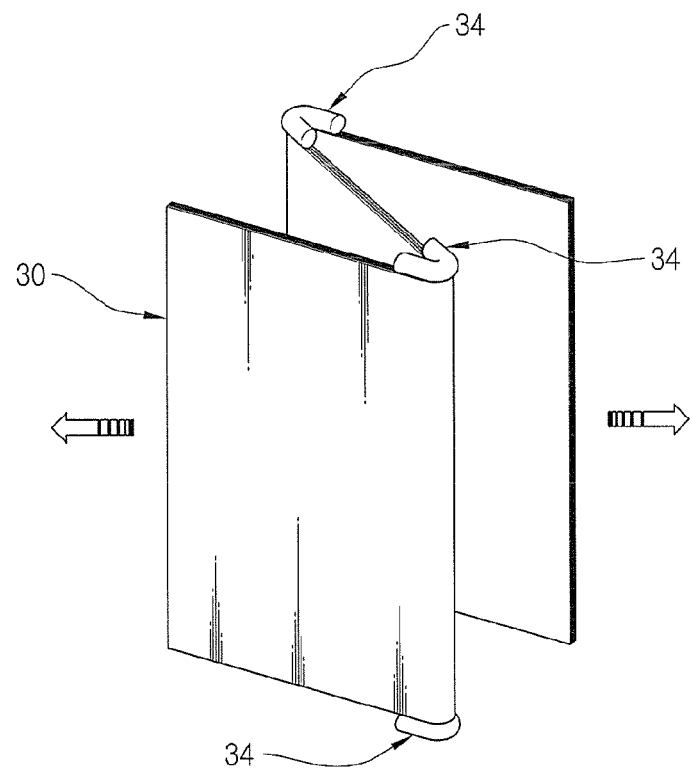
FIG. 4 is a perspective view of a flexible electronic product having a shape change characteristic according to an exemplary embodiment.

In FIG. 3, the actuators 32 are disposed along lengths of the opposite edges of the flexible electronic assembled body 30 having a folded structure, but the structures of the actuators 32 are not limited thereto. As illustrated in FIG. 4, a configuration in which actuators 34 are disposed along portions of the folded flexible electronic assembled body 30 may be included. The portions at which the actuators 34 are disposed may correspond to folds of the folded flexible electronic assembled body 30.

The flexible electronic products described above include actuators disposed along the edge of the flexible electronic assembled body. According to an exemplary embodiment, length change actuators may be disposed on or between the flexible electronic assembled bodies.

Figure 5A:
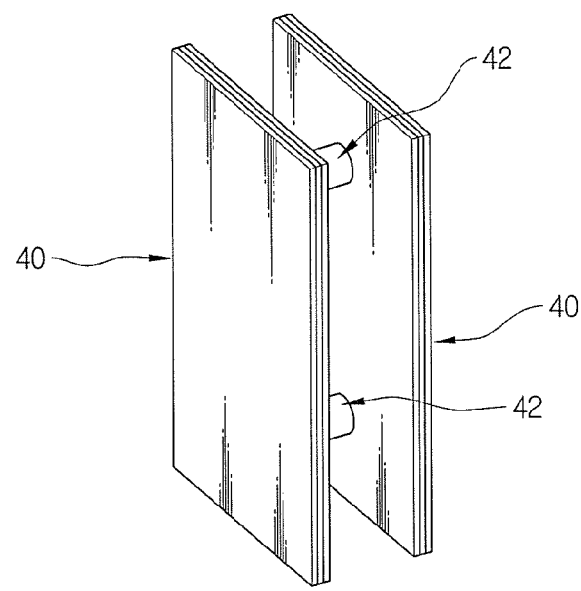
FIGS. 5A and 5B illustrate a flexible electronic product having a shape change characteristic according to an exemplary embodiment.
Figure 5B:
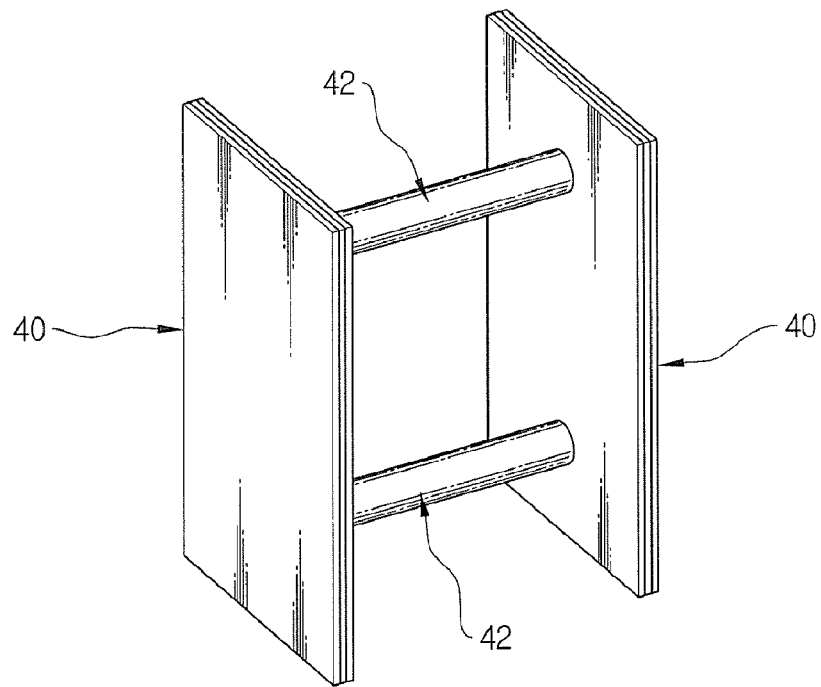

FIG. 5A and FIG. 5B illustrate a flexible electronic product having a shape is change characteristic according to an exemplary embodiment. FIG. 5A is a perspective view illustrating a changed shape of a flexible electron product in which an interval between opposing flexible electronic assembled bodies is narrowed by a power-off. FIG. 5B is a perspective view illustrating a changed shape of the flexible electron product in which the interval between the opposing flexible electronic assembled bodies is widened by a power-on.

As illustrated in FIG. 5A and FIG. 5B, flexible electronic assembled bodies 40 are disposed to oppose each other. The actuators 42 are disposed between the flexible electronic assembled bodies 40, and ends of the actuators 42 are connected to the flexible electronic assembled bodies 40.

The actuators 42 may include the shape memory member 20 or the shape memory member assembled body 22 including a plurality of the shape memory members 20 as described above.

Since the shape memory member 20 of the actuator 42 is a shape memory member of which the length is changed, the flexible electronic product as illustrated in FIG. 5A and FIG. 5B may have a changed shape in which an interval between the flexible electronic assembled bodies 40 is changed.

The actuator 42 is described as including the shape memory member of which the length is changed, however, aspects are not limited thereto. The shape of the flexible electronic product may be changed into various shapes using the actuator 42, the shape memory member 20, or the shape memory member assembled body 22, each of which can be changed to have a shape other than the length change.

According to an exemplary embodiment, a flexible display member or a flexible electronic assembled body of a roll type may be included in the flexible electronic product.

Figure 6A:
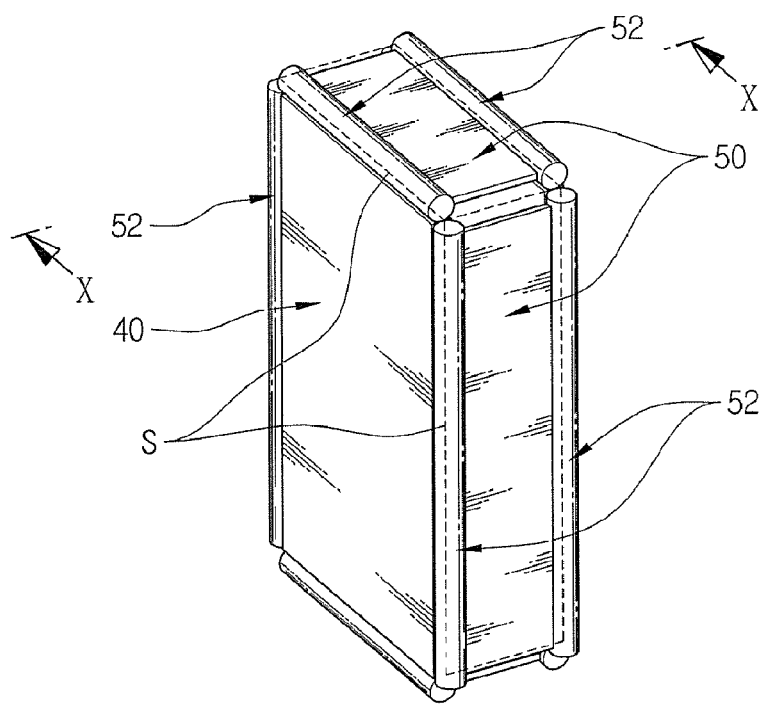
FIG. 6A and FIG. 6B illustrate a flexible electronic product having a shape is change characteristic according to an exemplary embodiment.
Figure 6B:
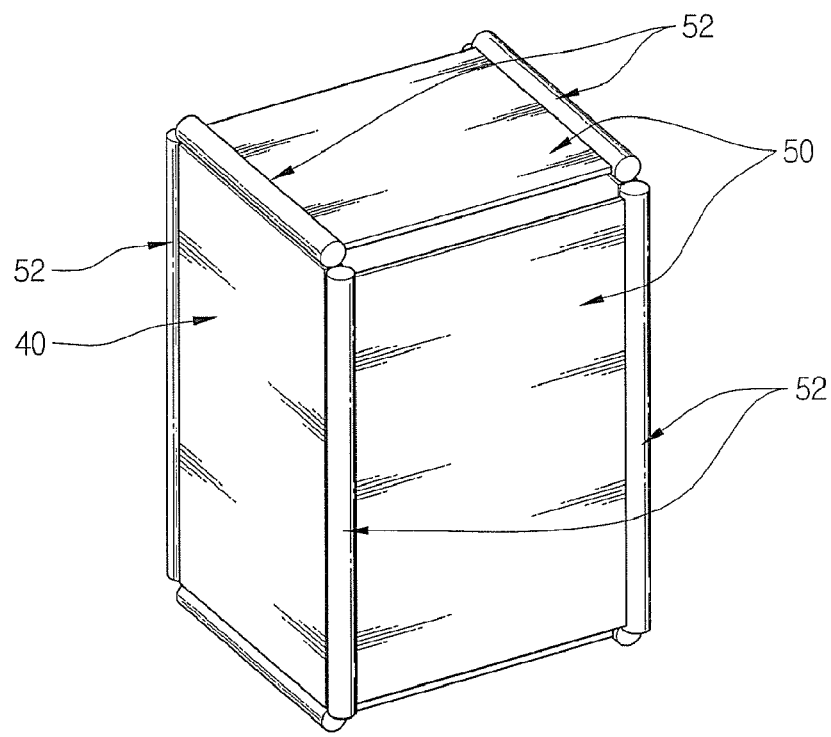
Figure 6C:
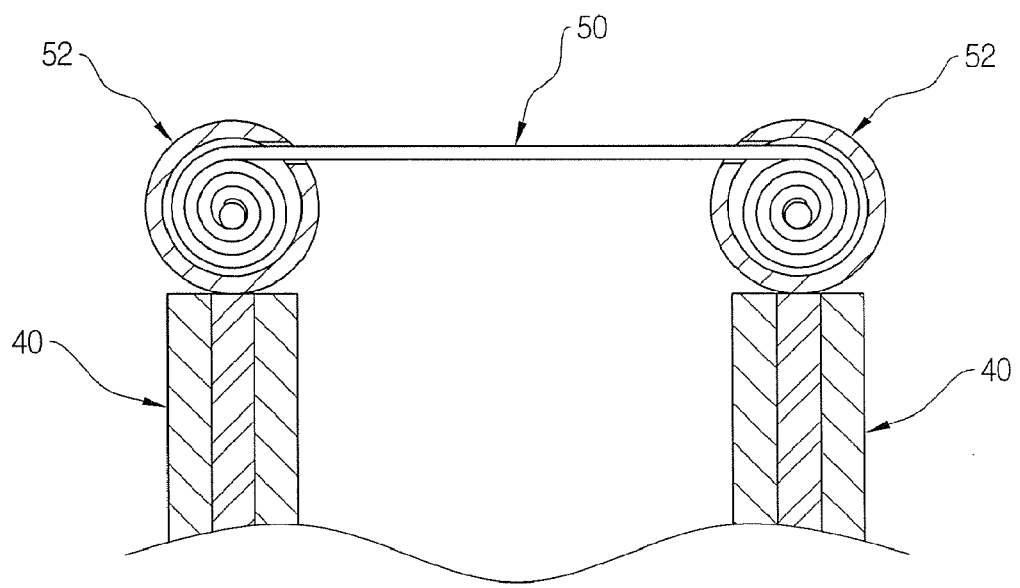
FIG. 6C is a partial cross-sectional view taken along the line X-X).

FIG. 6a, FIG. 6B, and FIG. 6C illustrate a flexible electronic product having a shape change characteristic according to an exemplary embodiment. FIG. 6A is a perspective view illustrating a changed shape in which an interval between flexible electronic assembled bodies is narrowed by a power-off. FIG. 6B is a perspective view illustrating a changed shape in which the interval between flexible electronic assembled bodies is widened by a power-on. FIG. 6C is a partial cross-sectional view taken along the line X-X of FIG. 6A.

As illustrated in FIG. 6a, FIG. 6B, and FIG. 6C, areas formed between flexible electronic assembled bodies 40 and 50 are described as virtual edges S, and the flexible electronic assembled bodies 40 and 50 are disposed to form a flexible rectangular prism. The flexible electronic assembled bodies 50 may be a roll-type flexible electronic assemble body.

Ends of the flexible electronic assembled bodies 50 disposed at the virtual edges S are connected to a winding unit 52 in which the flexible electronic assembled bodies may be wound. The winding unit 52 is connected to the flexible electronic assembled bodies 40.

As an example of the winding unit 52, a rotary actuator, a wind-up spring, an electric reel, or the like may be used. Further, any winding actuator that enables winding and unwinding or any mechanical winding drive member may be used.

Therefore, when a shape change occurs as illustrated in FIG. 6A and FIG. 6B, the flexible electronic assembled bodies 50 are wound or unwound from the winding unit 52 resulting in a length change of the flexible electronic device.

Using the changed shapes and the roll-type flexible electronic assembled body 50, a shape of an electronic product having multiple surfaces may be changed into various shapes.

According to an exemplary embodiment, a slide type flexible electronic product may include a length change actuator and a roll-type flexible electronic assembled body as is described above.

Figure 7A:
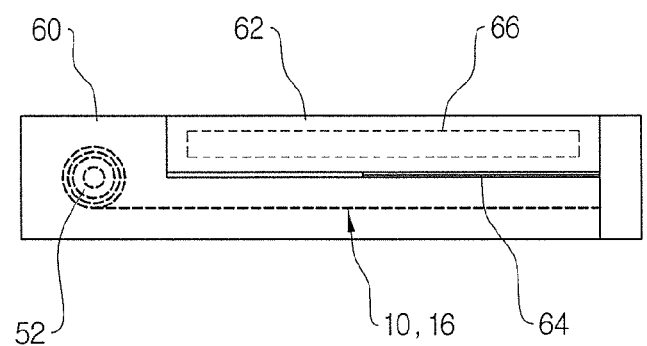
FIG. 7A and FIG. 7B illustrate a flexible electronic product having a shape change characteristic according to an exemplary embodiment.
Figure 7B:
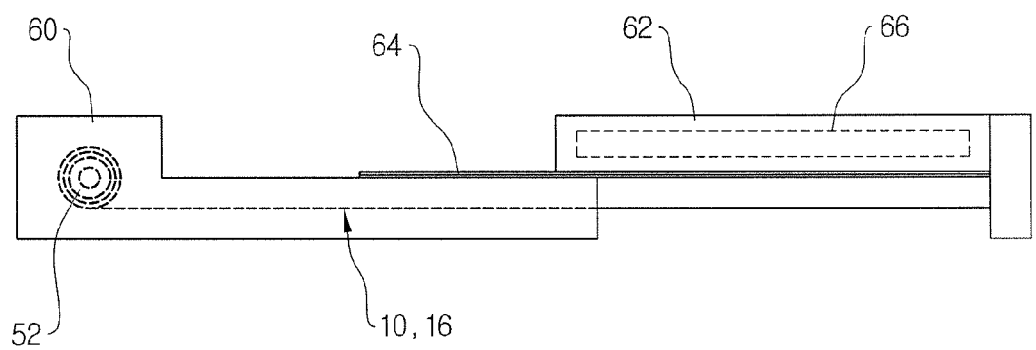

FIG. 7A and FIG. 7B illustrate a flexible electronic product having a shape change characteristic according to an exemplary embodiment. FIG. 7A is a plan view illustrating a changed shape of the flexible electronic product in which a slide member is closed by a power-off. FIG. 7B is a plan view illustrating a changed shape of the flexible electronic product in which the slide member is opened by a power-on.

A flexible electronic product illustrated in FIG. 7A and FIG. 7B includes a fixed member 60, a slide member 62 disposed to overlap a surface of the fixed member 60, and a length change actuator 64.

The actuator 64 is disposed at an interface between the fixed member 60 and the slide member 62, and the actuator 64 is connected to contact portions of the fixed member 60 and the slide member 62.

A winding unit 52 as described above is disposed at a side of the fixed member 60, and the slide member 62 may further include electronic components 66, such as a power supply unit and a control unit.

In addition, one end of the flexible display member 10 or the flexible electronic assembled body 16 as described above may be wound in the winding unit 52 so as to be connected thereto, and the other end of the flexible display member 10 or the flexible electronic assembled body 16 unwound from the winding unit 52 may be connected to the slide member 62.

In FIG. 7A and FIG. 7B, the winding unit 52, and the flexible display member 10 or the flexible electronic assembled body 16 are disposed in the flexible electronic product, and according to the change in shape, the flexible display member 10 or the flexible electronic is assembled body 16 is drawn or unwound from the fixed member 60. However, aspects are not limited thereto. For example, the winding unit 52, and the flexible display member 10 or the flexible electronic assembled body 16 may be exposed so as to be disposed on an outer surface of the flexible electronic product.

The actuator 64 may include the shape memory member 20 or the shape memory member assembled body 22 including a plurality of the shape memory members 20 as described above.

Therefore, if power is supplied to or removed from the shape memory member 20 or the shape memory member assembled body 22 of the actuator 64, as illustrated in FIG. 7A and FIG. 7B, the slide member 62 is slid along a slide surface, which is the interface of the fixed member 60. In such case, the flexible display member 10 or the flexible electronic assembled member 16 is wound or unwound from the winding unit 52.

A length change shape memory member as described may be used, but aspects are not limited thereto. The shape of the flexible electronic product may be changed into various shapes using the actuator 64, the shape memory member 20, or the shape memory member assembled body 22, each of which can be changed to have a shape other than the length change.

Figure 8:
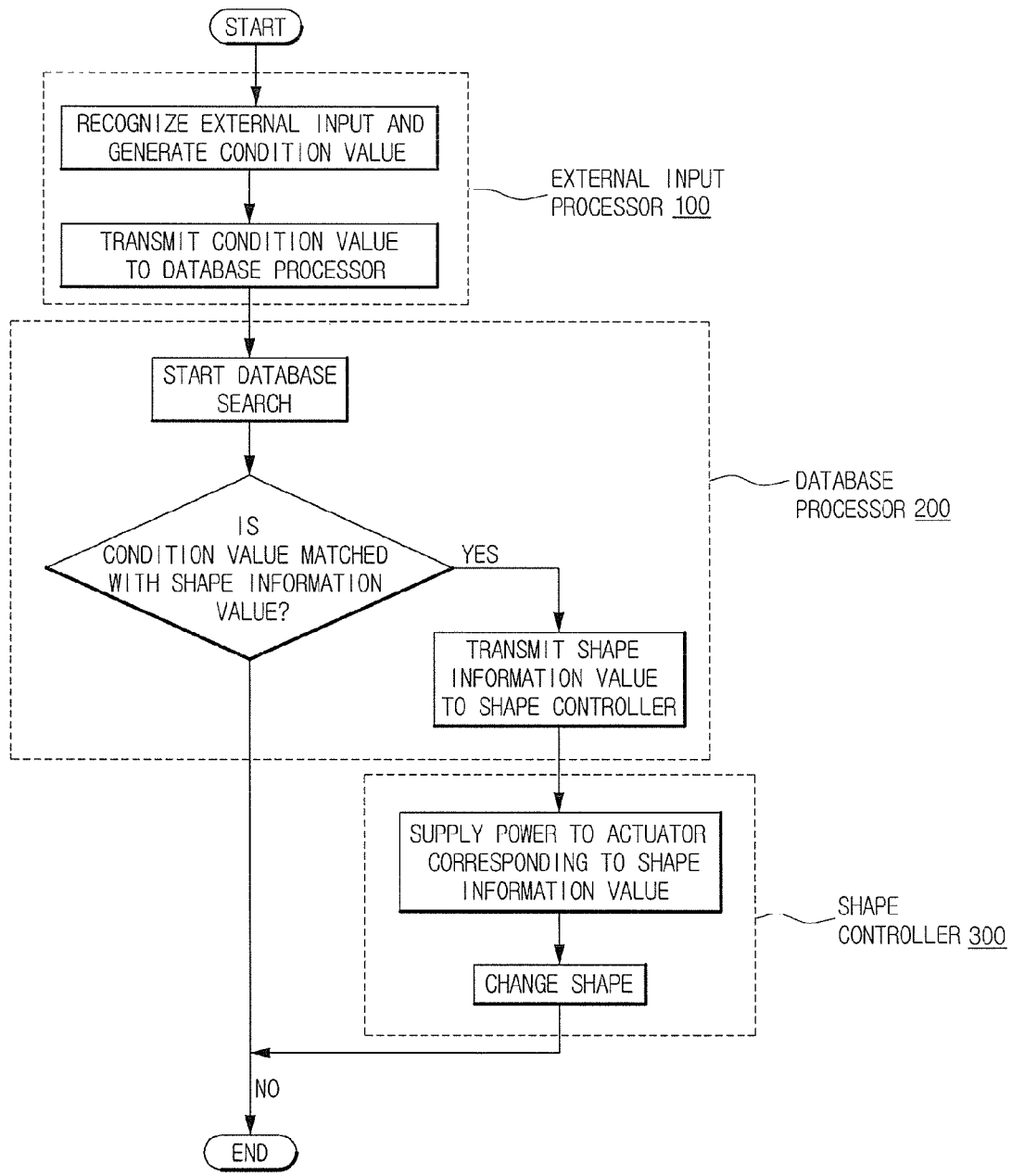
FIG. 8 is a flowchart showing a method for changing a shape of a flexible electronic product having a shape change characteristic according to an exemplary embodiment.

FIG. 8 is a flowchart showing method for changing a shape of a flexible electronic product having a shape change characteristic.

The method for changing a shape according to an exemplary embodiment may include processes performed by an external input processor 100, a database processor 200, and a shape controller 300. An external input processing process, a database processing process, and a shape controlling process are hereinafter described.

In the external input processing process performed by the external input processor 100, an external input received by a tangible input unit (e.g., touch screen, keypad, holographic keyboard based on infrared laser, or camera) which can be connected or linked to the flexible electronic product through wires or wirelessly, or an intangible input unit [e.g., environmental factors, user's body condition (i.e., body temperature, heartbeat, or pulse), physical movements, light intensities, voices, or sound recognition] which senses an input is recognized. Such inputs may be predetermined. For reference, examples of the tangible input unit and the intangible input unit are mentioned only for the understanding of the various input units, and it should be noted that the mentioned examples do not represent all possible input units.

If the external input is recognized in the external input processing process, a condition value of input information on the external input is generated and converted into a signal, and the signal having the condition value is transmitted to the database processor 200.

In the database processing process performed by the database processor 200, shape information is input, and the condition value of the signal transmitted from the external input processor 100 and a shape information value corresponding to the condition value are searched for in a database. The shape information may be predetermined.

If a shape information value corresponding to the condition value is not found in the database, performing a shape change function is ended. If a shape information value corresponding to the condition value is found in the database, a signal corresponding to the searched shape information value is transmitted to the shape controller 300.

In the shape controlling process performed by the shape controller 300, power is supplied to the actuator, the shape memory member, or the shape memory member assembled body corresponding to the shape information value transmitted from the database processor 200.

The shape of the flexible electronic product is changed by changing the shape of is the actuator that receives the power, and if the shape change is completed, power supply is cut off so as to end the shape change.

In Table 1, examples of changes in shape of the flexible electronic product according to condition values of external input information input through the tangible input unit or the intangible input unit described above are shown.

TABLE 1

| | Condition Value of Input Information | Change in Shape |
|---|---|---|
| 1 | TV/Desk | — → ∠ |
| 2 | Screen size increase | — → ▬ |
| 3 | SMS/Movie | — → ⌒ |
| 4 | Watch | — → ∩ |
| 5 | Phone | — → ( |
| 6 | Video conference | — → △ |
| 7 | Light & Sound | — → ⌒ |
| 8 | Body temperature & Heartbeat | Control of watch tightness |

As shown in the table, if the condition value of external input information is "TV/Desk", a change in shape of the flexible electronic product may occur to allow convenience while a user is sitting on a chair. The flexible electronic product may be deformed to stand on a base, such as a desk or table.

If the condition value of external input information is "screen size increase", a change in shape of the flexible electronic product to provide a wide screen may occur during, for example, video calling or video watching.

If the condition value of external input information is "SMS (Short Message Service)/movie", a change in shape of the flexible electronic product to adopt a bow or curved shape may occur in order to prevent an exposure of privacy to people nearby or to prevent annoying those nearby if the user checks a message or watches a video in a public space or in a crowded space.

If the condition value of external input information is "watch", a change in shape of the flexible electronic product to a circular shape or an angled circular shape may occur to is enclose a wrist to form a watch.

If the condition value of external input information is "phone", a change in shape of the flexible electronic product may occur to reduce sound losses during voice calls and to transmit accurate sounds to a receiver. For example, the flexible electronic product may be bent into a shape of a phone.

If the condition value of external input information is "video conference", if many people have to share a screen during a video conference, a change in shape of the flexible electronic product may occur to provide a same screen multiple times in various directions by changing the flexible electronic product into a triangular prism shape or other polygonal shape.

If the condition value of external input information is "light and sound", if ambient light is brightened and it becomes difficult to watch the screen, a change in shape of the flexible electronic product may occur to reduce the difficulty in screen watching due to light reflection by sensing the light intensity and changing the screen into a slightly bent bow shape. The changing of the shape of the flexible electronic product may be automatic in response to the sensed light intensity.

If the condition value of external input information is "body temperature and heartbeat", if a user exercises while wearing the flexible electronic product, for example, around his/her wrist, strengthening a tightening force of the watch shape may be provided if an increase in body temperature, heartbeat, or pulse is detected. Further, a service to inform a change in the user's body condition may be provided.

Furthermore, it should be noted that additional changes in shape other than the changed shapes described above, and change actuators corresponding to the changed shapes and assembled bodies of the change actuators may further be included.

As described above, the flexible electronic products having a shape change characteristic, the methods for changing a shape thereof, and the examples of the change in shape according to the various exemplary embodiments enable shape change operations and can adopt different shapes depending on input conditions.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A method for changing a shape of a flexible electronic product, wherein the flexible electronic product comprises a flexible electronic assembled body and an actuator disposed along at least a portion of the flexible electronic assembled body to change a shape of the flexible electronic assembled body, the method for changing a shape comprising:
    recognizing a signal input, generating a condition value of input information on the input signal;
    searching a database for a shape information value corresponding to the condition value; and
    supplying power to the actuator, the power corresponding to the shape information value searched in the database processing process, and controlling a change in shape of the actuator that receives the power.

2. The method for changing a shape of claim 1, wherein the controlling of the change in shape is ended if the shape information value corresponding to the condition value is not found in the database.

\* \* \* \* \*